(12) United States Patent
Kim

(10) Patent No.: US 12,095,310 B2
(45) Date of Patent: Sep. 17, 2024

(54) STATOR FOR ELECTRIC MOTOR, AND ELECTRIC MOTOR INCLUDING THE SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 17/754,726

(22) PCT Filed: Sep. 29, 2020

(86) PCT No.: PCT/KR2020/013328
§ 371 (c)(1),
(2) Date: Apr. 8, 2022

(87) PCT Pub. No.: WO2021/071171
PCT Pub. Date: Apr. 15, 2021

(65) Prior Publication Data
US 2024/0088730 A1   Mar. 14, 2024

(30) Foreign Application Priority Data

Oct. 11, 2019  (KR) .................. 10-2019-0126432
Nov. 4, 2019   (KR) .................. 10-2019-0139609
Sep. 25, 2020  (KR) .................. 10-2020-0124847

(51) Int. Cl.
*H02K 1/14*    (2006.01)
*H02K 3/28*    (2006.01)
*H02K 7/116*   (2006.01)

(52) U.S. Cl.
CPC .............. *H02K 1/146* (2013.01); *H02K 3/28* (2013.01); *H02K 7/1166* (2013.01)

(58) Field of Classification Search
CPC ......... H02K 1/146; H02K 3/28; H02K 7/1166
(Continued)

(56) References Cited

U.S. PATENT DOCUMENTS 7,466,092 B2     12/2008  Prudham
2006/0232159 A1*  10/2006  Tamaoka ............... H02K 1/146
                                                    310/216.054
(Continued)

FOREIGN PATENT DOCUMENTS

CN    203691195 U  *  7/2014  .............. H02K 3/20
JP    2004304928 A  *  10/2004
(Continued)

OTHER PUBLICATIONS

International Search Report for PCT/KR2020/013328 dated Jan. 22, 2021.

*Primary Examiner* — Jose A Gonzalez Quinones
(74) *Attorney, Agent, or Firm* — BROADVIEW IP LAW, PC

(57) ABSTRACT

A stator for an electric motor and an electric motor including the same are provided. A stator for an electric motor according to an exemplary embodiment of the present invention includes at least one coil, and a stator core including a yoke formed in a non-circular closed loop shape with at least one straight line portion, and a slot portion extending inward from the yoke by a predetermined length, wherein the slot portion includes a plurality of first slots on which the coil is wound and a plurality of second slots on which the coil is not wound, and at least one first slot of the plurality of first slots and at least one second slot of the plurality of second slots form the same phase as each other.

12 Claims, 11 Drawing Sheets

(58) Field of Classification Search
USPC .......................... 310/154.26, 216.001, 254.1
See application file for complete search history.

(56) References Cited

U.S. PATENT DOCUMENTS

| | | |
|---|---|---|
| 2009/0134738 A1 | 5/2009 | Yoshikawa et al. |
| 2016/0226321 A1* | 8/2016 | Krishnasamy ........... B25J 9/126 |

FOREIGN PATENT DOCUMENTS

| | | |
|---|---|---|
| JP | 2004535750 A | 11/2004 |
| JP | 2006304398 A | 11/2006 |
| KR | 20090065601 A | 6/2009 |
| KR | 20140022227 A | 2/2014 |
| KR | 20170113634 A | 10/2017 |

* cited by examiner

STATOR FOR ELECTRIC MOTOR, AND ELECTRIC MOTOR INCLUDING THE SAME

CROSS REFERENCE TO RELATED APPLICATIONS

This application is a National Phase Entry Application of PCT Application No. PCT/KR2020/013328 filed on Sep. 29, 2020, which claims priority to Korean Patent Application No. 10-2019-0126432 filed on Oct. 11, 2019 in Korean Intellectual Property Office, Patent Application No. 10-2019-0139609 filed on Nov. 4, 2019 in Korean Intellectual Property Office, Patent Application No. 10-2020-0124847 filed on Sep. 25, 2020 in Korean Intellectual Property Office, the entire contents of which are hereby incorporated by reference in its entirety.

TECHNICAL FIELD

The present invention relates to a stator for an electric motor and an electric motor including the same.

BACKGROUND ART

An electric motor is a device that uses electric energy to generate a driving force. Such electric motors are widely applied to various electronic devices, home appliances, automobiles, or the like.

For example, an electric motor is applied to an automobile engine to provide a driving force for driving an intake valve.

Meanwhile, in recent years, various efforts have been made to improve output and efficiency of automobile engines, and improving intake efficiency by adjusting intake valve timing is also part of these efforts.

The intake valve is opened and closed by reciprocating a driving rod connected to the intake valve through driving of a motor. To this end, an electric motor for operating the driving rod of the intake valve is installed in the engine room.

However, since various parts are installed in the engine room of the vehicle, there is a limitation in the installation space.

Accordingly, a conventional electric motor 1 for driving a vehicle valve including a rotor 20 and a stator 30 has a limit in that a rotor shaft 22 of the rotor 20 is inevitably connected to a driving rod 2 eccentrically via a worm wheel 3 and a worm gear 4 as shown in FIG. 11.

That is, a slot 32 on which a coil 40 is wound in the stator 30 has a limit in that it is inevitably formed in a direction biased toward one side in a housing 10, when considering the connection between the rotor shaft 22 and the driving rod 2 due to space constraints in the engine room.

For this reason, the conventional electric motor 1 for driving a vehicle valve has a problem in that output and efficiency are lowered.

If, in order to solve this problem, the size of the housing 10 to which the stator 30 is fixed is changed in consideration of the eccentric connection between the rotor shaft 22 and the driving rod 2, or the mounting position of the housing 10 mounted in the engine room is changed, interference with various other parts installed in the engine room may occur, or all the arrangement position of various other parts needs to be changed.

This has a problem in that the entire design of the engine room of the automobile needs to be redesigned.

SUMMARY OF THE INVENTION

The present invention has been devised in view of the above points, and is directed to providing a stator for an electric motor and an electric motor including the same capable of improving the efficiency of the motor without changing the existing mounting position even if it is mounted in a limited installation space such as an engine room.

TECHNICAL SOLUTION

One aspect of the present invention provides a stator for an electric motor, including: at least one coil; and a stator core including a yoke formed in a non-circular closed loop shape with at least one straight portion, and a slot portion extending inward from the yoke by a predetermined length, wherein the slot portion includes a plurality of first slots on which the coil is wound and a plurality of second slots on which the coil is not wound, and at least one first slot of the plurality of first slots and at least one second slot of the plurality of second slots form the same phase as each other.

In addition, the slot portion may form a multiphase including a first phase and a second phase different from the first phase, slots forming the first phase of the slot portion may include at least one the first slot and at least one the second slot, and slots forming the second phase of the slot portion may include at least one the first slot and at least one the second slot.

In this case, the number of first slots forming the first phase and the number of first slots forming the second phase may be the same number, and the length of first slots forming the first phase and the length of first slots forming the second phase may be formed to have the same length.

In addition, at least a portion of the plurality of second slots may be formed to have a different length from that of the first slot.

In addition, the yoke may include an arc portion formed to have a predetermined curvature; and a straight portion connected to ends of the arc portion.

In this case, the first slot may be a slot formed to extend inward by a predetermined length from the arc portion, and the second slot may be a slot formed to extend inward by a predetermined length from the straight portion.

For example, the arc portion may include a first arc portion and a second arc portion that are not connected to each other, and the straight portion may include a first straight portion connecting one ends of the first arc portion and the second arc portion to each other and a second straight portion connecting the other ends of the first arc portion and the second arc portion to each other.

In this case, the first arc portion and the second arc portion may be formed to have the same length as each other, or the first arc portion and the second arc portion may be formed to have different lengths.

In addition, the second straight portion may include a first portion connected to an end of the first arc portion and a second portion connected to an end of the first portion and connected to an end of the second arc portion, and the second portion may be connected to one end of the first portion to have a predetermined angle except for 0 degree with the first portion.

In this case, in the second straight portion, a portion where the first portion and the second portion are connected to each other may be formed to protrude inward of the yoke or may be formed to protrude outward of the yoke.

Meanwhile, the present invention provides an electric motor, including: a housing; a rotor comprising a rotor shaft rotatably mounted to the housing and a plurality of magnets disposed along the circumferential direction of the rotor shaft; and a stator fixed to the housing so as to surround a circumference of the rotor and having a coil wound on at least one slot; wherein the stator is a stator for an electric motor described above.

In addition, the rotor shaft may be gear-coupled with a driving rod entering the inside of the housing via a gear unit as a medium, and the driving rod may be eccentrically connected to the rotor shaft via the gear unit as a medium.

According to the present invention, even if it is installed in a limited installation space such as an engine room, higher output and efficiency can be realized without changing the existing mounting position or redesigning the surrounding related parts.

In addition, according to the present invention, the position of the slot on which the coil is wound in the stator can be freely arranged, thereby increasing the degree of freedom in design.

DETAILED DESCRIPTION OF THE INVENTION

Figure 1:
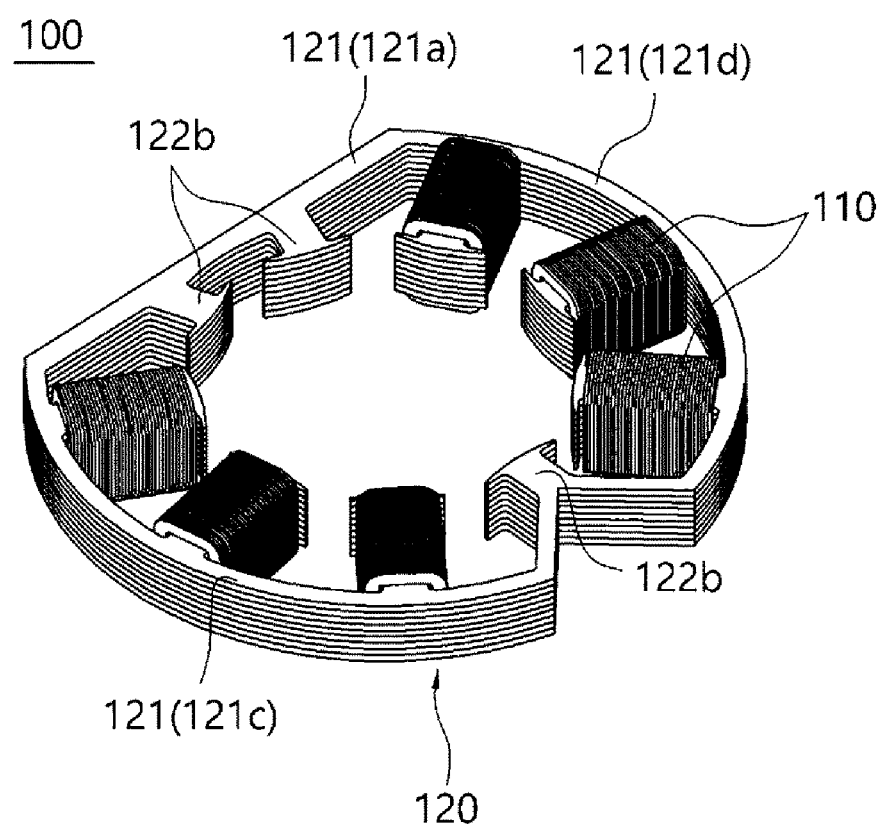
FIG. 1 is a view illustrating a stator for an electric motor according to one embodiment of the present invention.
Figure 2:
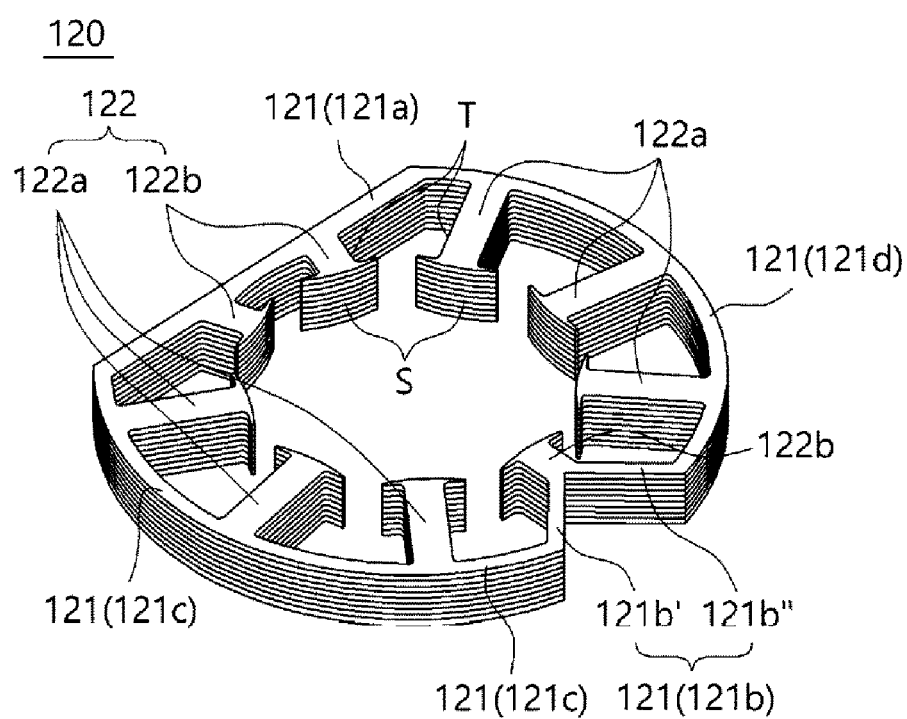
FIG. 2 is a view illustrating a state in which coils are removed in FIG. 1.

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention. Throughout the specification, like reference numerals denote like elements.

A stator 100 for an electric motor according to one embodiment of the present invention may include at least one coil 110 and a stator core 120 as shown in FIG. 1, and the at least one coil 110 may be wound on the stator core 120.

That is, the stator core 120 may include a yoke 121 and a slot portion 122, and the coil 110 may be wound around the slot portion 122.

As shown in FIG. 1, the stator core 120 may have a form in which a plurality of metal sheets including the yoke 121 and the slot portion 122 are stacked in multiple layers, but the present invention is not limited thereto and may be formed as a single member.

In this case, the yoke 121 may be formed in a non-circular closed loop shape.

That is, as shown in FIGS. 2 to 6, the yoke 121 may include at least one straight portion 121a and 121b and at least one arc portion 121c and 121d formed to have a predetermined curvature, and the straight portions 121a and 121b and the arc portions 121c and 121d may be connected to each other.

Through this, the yoke 121 may have a non-circular closed loop shape through the straight portions 121a and 121b and the arc portions 121c and 121d.

Figure 4:
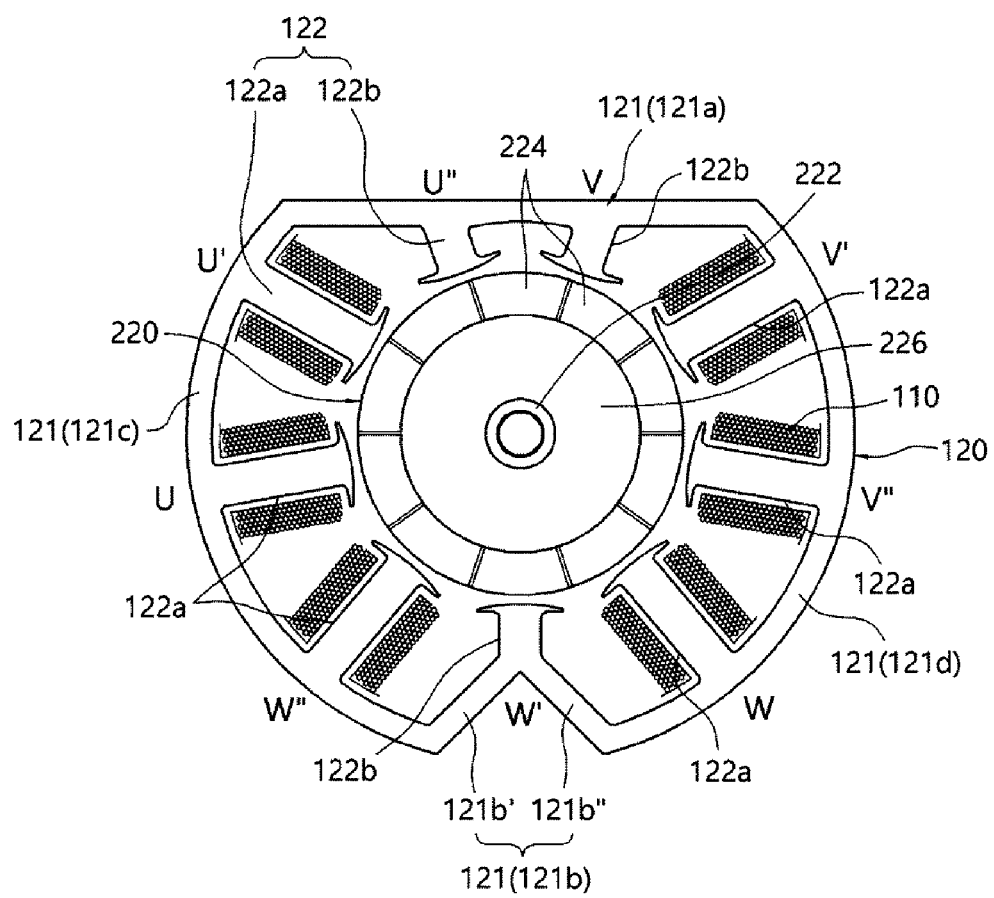
FIG. 4 is a view illustrating an arrangement relationship between a slot portion of a stator core and a magnet of a rotor in a stator for an electric motor according to one embodiment of the present invention.
Figure 5:
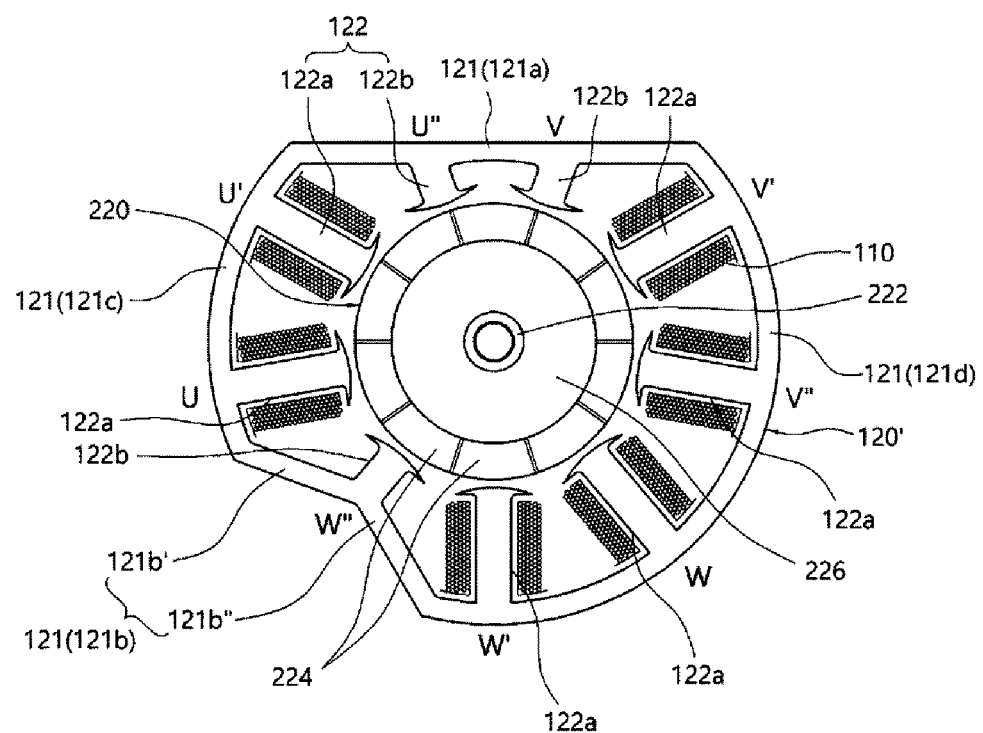
FIG. 5 is a view illustrating another form of a stator core that can be applied to FIG. 4.
Figure 6:
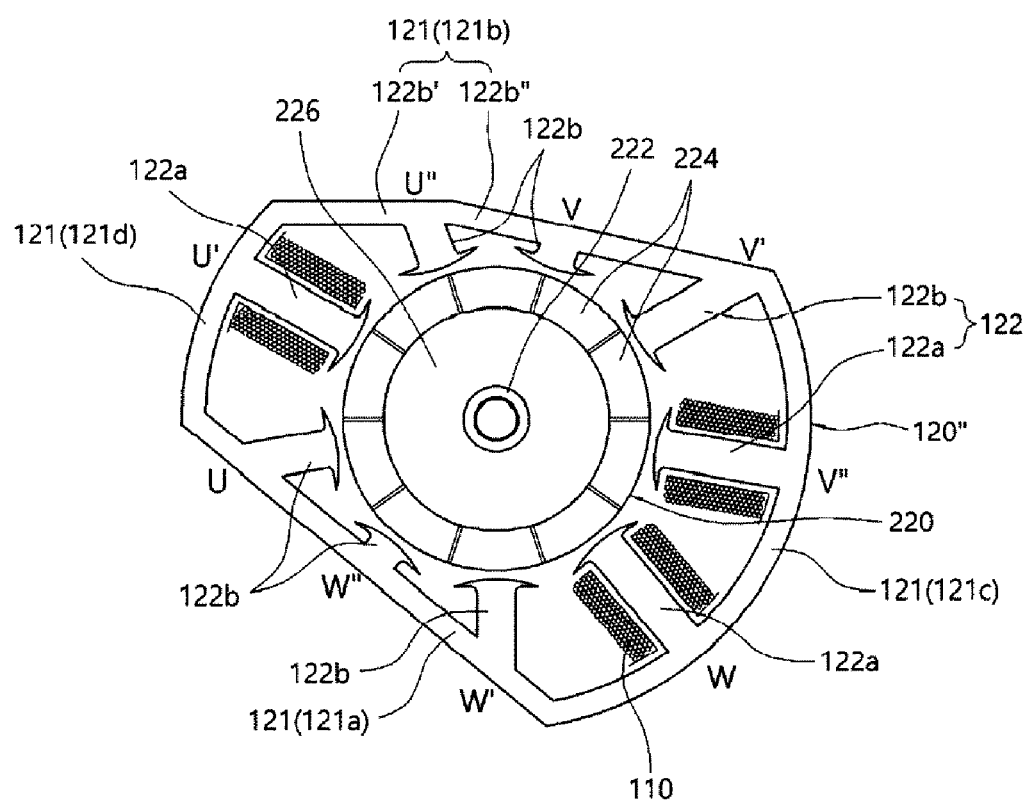
FIG. 6 is a view illustrating yet another form of a stator core that can be applied to FIG. 4.

Specifically, as shown in FIGS. 4 to 6, the yoke 121 may be formed in a non-circular closed loop shape through the arc portions 121c and 121d including a first arc portion 121c and a second arc portion 121d, and the straight portions 121a and 121b including a first straight portion 121a and a second straight portion 121b.

In this case, the first arc portion 121c and the second arc portion 121d may not be connected to each other, and each of the first straight portion 121a and the second straight portion 121b may connect the ends of the first arc portion 121c and the second arc portion 121d, respectively.

In this case, the first arc portion 121c and the second arc portion 121d may be formed to have the same length, or may be formed to have different lengths. In addition, at least one of the first straight portion 121a and the second straight portion 121b may be formed so that the length of a portion that is not a straight line has a predetermined angle with respect to the remaining length.

Through this, the yoke 121 may be changed into various shapes according to the arrangement position, length, and shape of the first straight portion 121a and/or the second straight portion 121b which connect the first arc portion 121c and the second arc portion 121d to each other.

As a specific example, as shown in FIG. 4, the first arc portion 121c and the second arc portion 121d may be formed to have the same length as each other, the first straight portion 121a connecting one ends of the first arc portion 121c and the second arc portion 121d to each other may be formed in a straight line, and the second straight portion 121b connecting the other ends of the first arc portion 121c and the second arc portion 121d to each other may include a first portion 121b' and a second portion 121b" connected to have a predetermined angle.

In this case, the first portion 121b' may have one end connected to the end of the first arc portion 121c and the other end connected to the second portion 121b", and the second portion 121b" may have one end connected to the end of the second arc portion 121d and the other end connected to the first portion 121b'.

In this case, the second portion 121b" may be connected to one end of the first portion 121b' to have a predetermined angle except for 0 degree with the first portion 121b', and a portion where the first portion 121b' and the second portion 121b" are connected to each other may be connected to protrude inward of the yoke 121.

As another example, as shown in FIG. 5, the first arc portion 121c and the second arc portion 121d may be formed to have different lengths, the first straight portion 121a connecting one ends of the first arc portion 121c and the second arc portion 121d to each other may be formed in a straight line, and the second straight portion 121b connecting the other ends of the first arc portion 121c and the second arc portion 121d to each other may include a first portion 121b' and a second portion 121b" connected to have a predetermined angle.

In this case, the first portion 121b' may have one end connected to the end of the first arc portion 121c and the other end connected to the second portion 121b", and the second portion 121b" may have one end connected to the end of the second arc portion 121d and the other end connected to the first portion 121b'.

In this case, the second portion 121b" may be connected to one end of the first portion 121b' to have a predetermined angle except for 0 degree with the first portion 121b', and a portion where the first portion 121b' and the second portion 121b" are connected to each other may be connected to protrude inward of the yoke 121.

As yet another example, as shown in FIG. 6, the first arc portion 121c and the second arc portion 121d may be formed to have different lengths, the first straight portion 121a connecting one ends of the first arc portion 121c and the second arc portion 121d to each other may be formed in a straight line, and the second straight portion 121b connecting the other ends of the first arc portion 121c and the second arc portion 121d to each other may include a first portion 121b' and a second portion 121b" connected to have a predetermined angle.

In this case, the first portion 121b' may have one end connected to the end of the first arc portion 121c and the other end connected to the second portion 121b", and the second portion 121b" may have one end connected to the end of the second arc portion 121d and the other end connected to the first portion 121b'.

In this case, the second portion 121b" may be connected to one end of the first portion 121b' to have a predetermined angle except for 0 degree with the first portion 121b', and a portion where the first portion 121b' and the second portion 121b" are connected to each other may be connected to protrude outward of the yoke 121.

Through this, the yoke 121 may be formed to have a closed loop shape of various shapes rather than a circle.

The slot portion 122 may be wound with a coil 110 that generates a magnetic field when the stator 100 is powered. To this end, the slot portion 122 may extend inwardly from the yoke 121 by a predetermined length so that the coil 110 may be wound with a predetermined number of turns.

The slot portion 122 may be placed spaced apart along the edge of the yoke 121 and may include a plurality of slots 122a and 122b protruding inward of the yoke 121.

Figure 3:
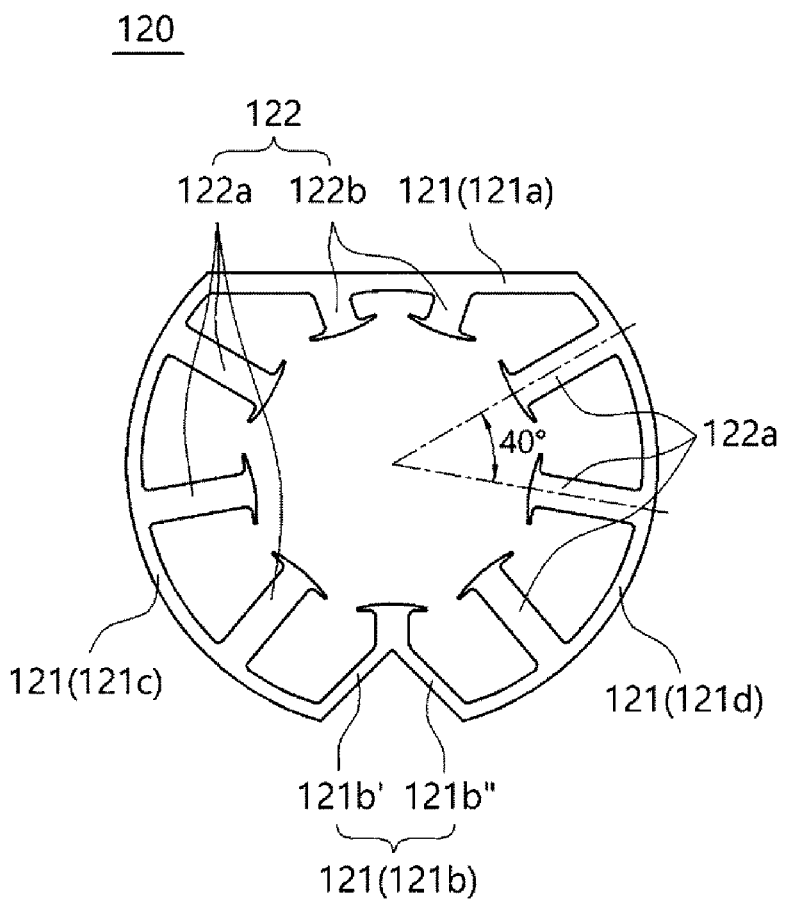
FIG. 3 is a top plan view of FIG. 2.

In this case, the plurality of slots 122a and 122b may be arranged to form an isometric angle with respect to a central point as shown in FIG. 3.

Through this, as shown in FIG. 4, when the rotor 220 constituting the electric motor 200 is disposed inside the yoke 121, the plurality of slots 122a and 122b may be disposed to surround the rotor 220, and the plurality of slots 122a and 122b may be disposed at equal angles along the circumference of the rotor 220.

In this case, the coil 110 wound on the slot portion 122 may be wound only on some of the slots 122a and 122b among the plurality of slots 122a and 122b.

That is, the slot portion 122 may include a plurality of first slots 122a on which the coil 110 is wound and a plurality of second slots 122b on which the coil 110 is not wound.

Here, each of the first slot 122a and the second slot 122b may include a tooth T extending inward from the yoke 121 by a predetermined length and a shoe S formed at an end of the tooth T, respectively, and the coil 110 may be wound around the tooth T of the first slot 122a.

In this case, at least one first slot 122a of the plurality of first slots 122a and at least one second slot 122b of the plurality of second slots 122b may form the same phase as each other.

That is, when the slot portion 122 is formed to have a single phase, the first slot 122a and the second slot 122b may form the same phase as each other, and each of the first slot 122a and the second slot 122b forming the same phase may be provided with at least one and the same number as each other, and when the first slot 122a is provided in plurality, the plurality of first slots 122a may be formed to have the same length.

In this case, the first slot 122a may be formed to extend inward by a predetermined length from the arc portions 121c and 121d of the yoke 121, and the second slot 122b may be formed to extend inward by a predetermined length from the straight portions 121a and 121b of the yoke 121.

Through this, even if the yoke 121 is formed in a non-circular closed loop shape as described above and a plurality of first slots 122a are provided, the length of each of the first slots 122a may have the same length as each other, and the first slot 122a and the second slot 122b may be formed such that a shoe S formed at an end is positioned on an imaginary circumference.

Accordingly, when the rotor 220 is disposed inside the yoke 121, the first slot 122a and the second slot 122b constituting the slot portion 122 may be disposed to surround the circumferential surface of the rotor 220.

As another example, when the slot portion 122 is formed to have a multiphase including a first phase and a second phase different from the first phase, some of the plurality of first slots 122a may have the first phase, and some of the plurality of first slots 122a may have the second phase.

Similarly, when the slot portion 122 is formed to have a multiphase including a first phase and a second phase different from the first phase, some of the plurality of second slots 122b may have the first phase, and some of the plurality of second slots 122b may have the second phase.

That is, when the slot portion 122 is formed to have a multiphase, the slots forming the first phase of the slot portion 122 may include at least one first slot 122a and at least one second slot 122b, and the slots forming the second phase of the slot portion 122 may also include at least one first slot 122a and at least one second slot 122b.

In this case, the number of first slots 122a forming the first phase and the number of first slots 122a forming the second phase may be the same number, the first slots 122a on which the coil 110 is wound may be provided to have the same length as each other, and at least a portion of the plurality of second slots 122b may be formed to have a different length from that of the first slot 122a.

In addition, the first slot 122a may be formed to extend inward by a predetermined length from the arc portions 121c and 121d of the yoke 121, and the second slot 122b may be formed to extend inward by a predetermined length from the straight portions 121a and 121b of the yoke 121.

Through this, even if the yoke 121 is formed in a non-circular closed loop shape as described above and the first slot 122a and the second slot 122b are provided in plurality, the length of each of the first slots 122a may have the same length as each other, and the plurality of first slots 122a and second slots 122b may be formed such that a shoe S formed at an end is positioned on an imaginary circumference.

Accordingly, when the rotor 220 is disposed inside the yoke 121, the plurality of first slots 122a and second slots 122b constituting the slot portion 122 may be disposed to surround the circumferential surface of the rotor 220.

For example, the slot portion 122 may be formed in three phases including a first phase, a second phase and a third phase, the slot portion 122 may include a plurality of first slots 122a and a plurality of second slots 122b, and each of the first phase, the second phase, and the third phase may be configured to have the same number of first slots 122a and second slots 122b.

As a specific example, as shown in FIGS. 4 and 5, when the stator 100 according to one embodiment of the present invention is applied to an electric motor 200 having a 9:10 structure in which the total number of slots 122a and 122b is 9 and the total number of magnets 224 provided in the rotor 220 is 10, the first phase may include U, U' and U", the second phase may include V, V' and V", and the third phase may include W, W' and W".

In this case, each of the first phase, the second phase, and the third phase may be formed through three slots 122a and 122b, and each phase may include two first slots 122a and one second slot 122b.

That is, U and U' constituting the first phase may be formed through two first slots 122a, and the remaining U" constituting the first phase may be formed through one second slot 122b.

In addition, V' and V" constituting the second phase may be formed through two first slots 122a, and the remaining V constituting the second phase may be formed through one second slot 122b.

Similarly, W and W" constituting the third phase may be formed through two first slots 122a, and the remaining W constituting the third phase may be formed through one second slot 122b.

In this case, the length of the second slots 122b forming the U", V and W' may have a relatively shorter length than the length of the first slots 122a forming the U, U', V', V", W and W"', and the first slots 122a forming the U, U', V', V", W and W" may have the same length.

In addition, the first slots 122a forming the U, U', V', V", W and W" may be formed to be located on the arc portions 121c and 121d of the yoke 121, and the second slots 122b forming the U", V and W may be formed to be located on the straight portions 121a and 121b of the yoke 121.

Through this, the shoe S of each of the first slots 122a and the shoe S of each of the second slots 122b may be arranged to surround the magnet 224 provided in the rotor 220 by the same distance.

That is, the shoe S of each of the first slots 122a and the shoe S of each of the second slots 122b may be arranged to be located on an imaginary circumference with the rotor shaft 222 provided in the rotor 220 as a central point.

Accordingly, even if the yoke 121 is formed in a non-circular shape, the coil 110 may be wound in the same number of turns in each of the first slots 122a formed to have the same length as each other, and the first slots 122a and the second slots 122b forming each phase may be disposed to surround the magnet 224 of the rotor 220 by the same distance, whereby a uniform driving force may be implemented.

Similarly, as shown in FIG. 6, when the stator 100 according to one embodiment of the present invention is applied to an electric motor 200 having a 9:10 structure in which the total number of slots 122a and 122b is 9 and the total number of magnets 224 provided in the rotor 220 is 10, the first phase may include U, U' and U", the second phase may include V, V' and V", and the third phase may include W, W' and W.

In this case, each of the first phase, the second phase, and the third phase may be formed through three slots 122a and 122b, and each phase may include one first slot 122a and two second slots 122b.

That is, U constituting the first phase may be formed through one first slot 122a, and the remaining U' and U" constituting the first phase may be formed through two second slots 122b.

In addition, V" constituting the second phase may be formed through one first slot 122a, and the remaining V and V' constituting the second phase may be formed through two second slots 122b.

Similarly, W constituting the third phase may be formed through one first slot 122a, and the remaining W' and W" constituting the third phase may be formed through two second slots 122b.

In this case, the length of the second slots 122b forming the U, U", V, V', W' and W" may have a relatively shorter length than the length of the first slots 122a forming the U', V" and W, and the first slots 122a forming the U', V", and W may have the same length.

In addition, the first slots 122a forming the U', V" and W may be formed to be located on the arc portions 121c and 121d of the yoke 121, and the second slots 122b forming the U, U", V, V', W' and W" may be formed to be located on the straight portions 121a and 121b of the yoke 121.

Through this, the shoe S of each of the first slots 122a and the shoe S of each of the second slots 122b may be arranged to surround the magnet 224 provided in the rotor 220 by the same distance.

That is, the shoe S of each of the first slots 122a and the shoe S of each of the second slots 122b may be arranged to be located on an imaginary circumference with the rotor shaft 222 provided in the rotor 220 as a central point.

Accordingly, even if the yoke 121 is formed in a non-circular shape, the coil 110 may be wound in the same number of turns in each of the first slots 122a formed to have the same length as each other, and the first slots 122a and the second slots 122b forming each phase may be disposed to surround the magnet 224 of the rotor 220 by the same distance, whereby a uniform driving force may be implemented.

Figure 7:
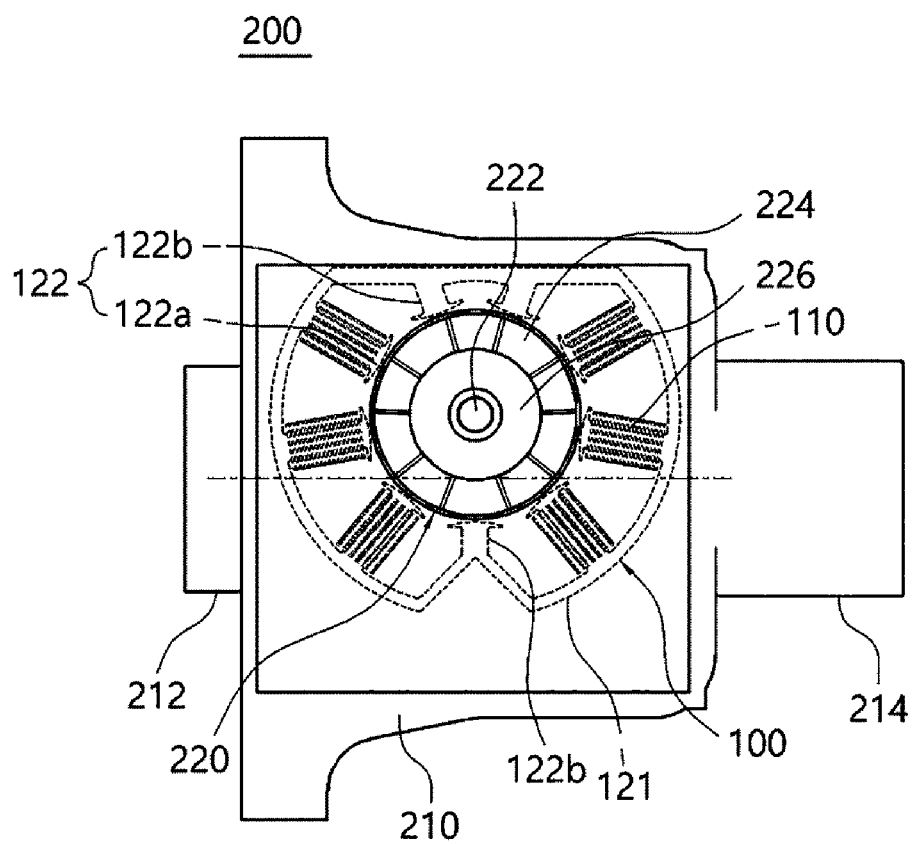
FIG. 7 is an electric motor according to one embodiment of the present invention.

Due to this, when the electric motor 200 to which the stator 100 for an electric motor according to one embodiment of the present invention is applied is used, as shown in FIG. 7, even if the rotor shaft 222 constituting the electric motor 200 is disposed at a position biased to one side from the center of a housing 210, a plurality of first slots 122a and second slots 122b may be disposed to completely surround the circumference of the rotor 220.

Figure 9:
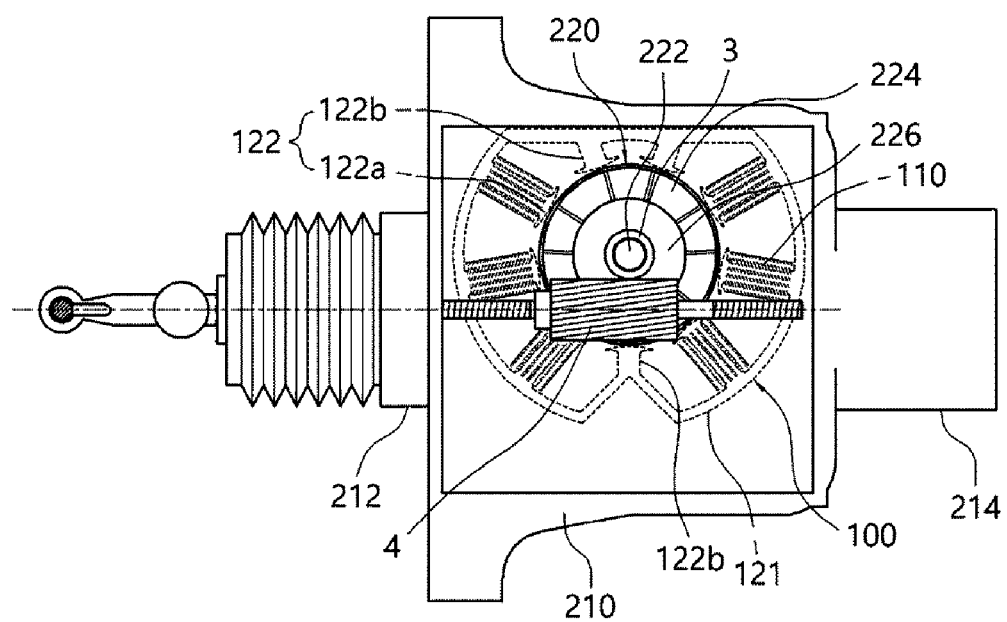
FIG. 9 is a view illustrating a state in which an electric motor according to one embodiment of the present invention is connected to a driving rod.

Through this, as shown in FIG. 9, even if the electric motor 200 to which the stator 100 for an electric motor according to one embodiment of the present invention is applied is mounted in a limited space where a size and shape are determined, and the rotor shaft 222 is eccentrically connected to the driving rod 2, a plurality of first slots 122a and second slots 122b may be disposed to completely surround the circumference of the rotor 220.

As described above, in the stator 100 for an electric motor according to one embodiment of the present invention, since the yoke 121 is formed in a non-circular shape, the overall shape can be variously changed, and even if the shape of the yoke 121 is changed, since the length of each of the first slots 122a on which the coil 110 is wound can be formed to have the same length, it has an advantage of increasing the degree of freedom in design while preventing a decrease in the efficiency of the motor.

In the drawings and description, even though it is illustrated that the stator 100 for an electric motor according to one embodiment of the present invention has a structure a 9:10 structure in which the total number of slots 122a and 122b is 9 and the total number of magnets 224 of the rotor 220 is 10, the present invention is not limited thereto, and may be applied without limitation if the total number of slots is 6 or more.

For example, the stator 100 for an electric motor according to one embodiment of the present invention may be applied to an electric motor having a 3:2 structure in which the total number of slots is 9 and the total number of magnets is 6, as well as an electric motor having a 3:4 structure, a 9:8 structure, or the like.

Furthermore, the stator 100 for an electric motor according to one embodiment of the present invention may be applied to a three-phase motor having the above-described structure, as well as a multi-phase motor having a different structure, and may also be applied to a single-phase motor such as a 4:4 structure.

In addition, in the stator 100 for an electric motor according to one embodiment of the present invention, the total number of the first slots 122a on which the coil 110 is wound and the total number of the second slots 122b on which the coil 110 is wound may be the same as or different from each other.

Meanwhile, the stator 100 for an electric motor according to one embodiment of the present invention may be implemented as an electric motor 200.

Such an electric motor 200 according to one embodiment of the present invention may be applied to various equipment such as industrial equipment, home equipment, vehicles, or the like.

As a non-limiting example, the electric motor 200 may be used for opening/closing a valve installed in a vehicle, and the valve may be an intake valve of an engine for controlling an intake air amount to the engine of the vehicle. In this case, the valve may be opened and closed through the driving rod 2, and the electric motor 200 may provide a driving force for moving the driving rod 2. However, the application target of the electric motor 200 according to one embodiment of the present invention is not limited thereto.

Hereinafter, for convenience of description, it will be described that the electric motor 200 according to one embodiment of the present invention is used as an electric motor for driving a vehicle valve.

That is, the electric motor 200 according to one embodiment of the present invention may include a housing 210, a rotor 220 and a stator 100 as shown in FIG. 7, and the stator 100 may be the above-described stator 100 for an electric motor.

The housing 210 may be mounted in a vehicle such as an engine room of the vehicle, and the rotor 220 and the stator 100 may be installed therein.

In such a housing 210, a coupling portion 212 may be formed on one side so that the driving rod 2 that is gear-coupled to the rotor 220 can enter.

In addition, the housing 210 may include a connector 214 for electrical connection with a circuit board (not shown) installed therein to control driving of the rotor 220 and the stator 100.

Such a housing 210 may be made of a material having heat dissipation so as to radiate heat generated during operation to the outside. For example, the housing 210 may be made of a known heat-dissipating plastic material.

The rotor 220 may include a plurality of magnets 224 disposed around the rotor shaft 222 having a predetermined length, and may be rotatably mounted to the housing 210.

That is, the rotor 220 may include a rotor shaft 222 rotatably mounted to the housing 210 and a rotor core 226 formed to surround the circumference of the rotor shaft 222, and the plurality of magnets 224 may be disposed along the circumferential direction of the rotor core 226.

Figure 8:
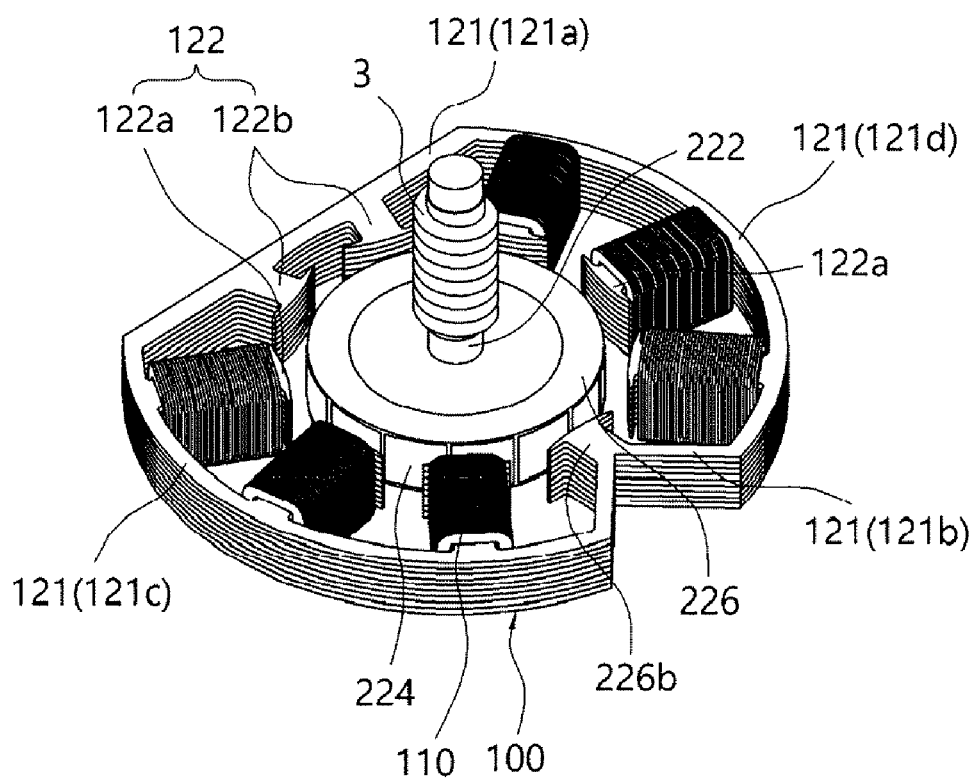
FIG. 8 is a view taken from the rotor and stator in FIG. 7.

Such a rotor 220 may be disposed to be located inside the stator 100 as shown in FIG. 8. Through this, when a current is supplied to the coil 110 of the stator 100, the rotor 220 may be rotated through interaction with a magnetic field generated from the coil 110.

In this case, the rotor shaft 222 may be gear-coupled with the driving rod 2 entering the inside of the housing 210 through the coupling portion 212 via a gear unit as a medium, and the rotor shaft 222 may be eccentrically connected to the driving rod 2 inside the housing 210. For example, the gear unit may be a worm wheel 3 and a worm gear 4.

Figure 10:
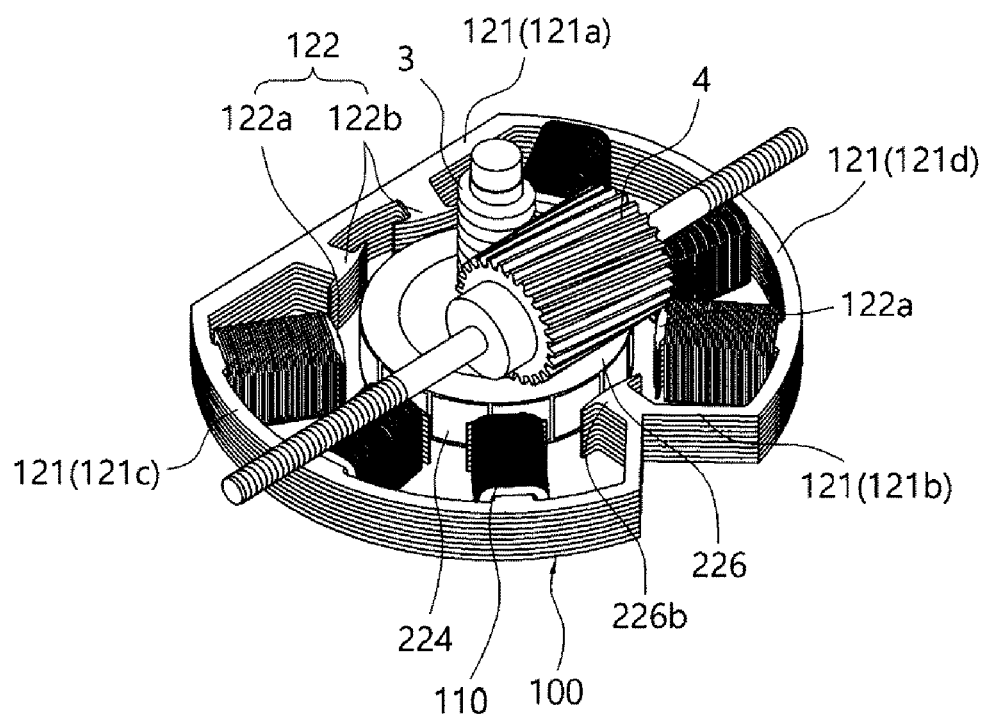
FIG. 10 is a view taken from the rotor, the stator and the driving rod in FIG. 9.

Specifically, the rotor shaft 222 may be rotatably mounted at an eccentric position from the center of the housing 210 as shown in FIGS. 9 and 10, and the driving rod 2 may be disposed in a direction coincident with an imaginary central axis of the housing 210.

In this case, as shown in FIGS. 8 and 10, the worm wheel 3 may be shaft-coupled to the end side of the rotor shaft 222, and the worm gear 4 gear-coupled to the worm wheel 3 may be provided on the driving rod 2 side as shown in FIG. 10.

Accordingly, the rotor shaft 222 and the driving rod 2 may be eccentrically connected to each other through the worm wheel 3 and the worm gear 4, and when the rotor shaft 222 rotates, the driving rod 2 may reciprocate according to the rotational direction of the rotor shaft 222. Through this, the valve connected to the driving rod 2 may be opened/closed according to the moving direction of the driving rod 2.

The stator 100 may be disposed to surround the magnet 224 of the rotor 220.

That is, the stator 100 may include at least one coil 110 and a stator core 120, the stator core 120 may include a yoke 121 and a slot portion 122, and the coil 110 may be wound around the slot portion 122.

Such a stator 100 may be the stator 100 for an electric motor described above with reference to FIGS. 1 to 6 as it is.

That is, the yoke 121 may be formed in a non-circular closed loop shape as described above, and the slot portion 122 may include at least one first slot 122a on which the coil 110 is wound and at least one second slot 122b on which the coil 110 is not wound.

Specific details of the yoke 121 and the slot portion 122 are the same as those described above, and thus a detailed description thereof will be omitted.

Through this, even if in the electric motor 200 according to one embodiment of the present invention, as shown in FIG. 9, the rotor shaft 222 is mounted in a position biased to one side in the housing 210 rather than the central portion of the housing 210, and the driving rod 2 and the rotor shaft 222 are eccentrically connected to each other, a plurality of first slots 122a on which the coil 110 is wound may be disposed to surround the circumference of the rotor shaft 222.

In particular, as shown in FIG. 7 and FIG. 9, when the stator core 120 is mounted inside the housing 210 so that the first straight portion 121a described above is parallel to the inner wall surface of the housing 210, space utilization within a limited space can be maximized.

That is, even if the rotor shaft 222 is disposed at a position biased to one side from the center of the housing 210 so as to be eccentrically connected to the driving rod 2, the length of the first slot 122a on which the coil 110 is wound may have a relatively longer length than the length of the second slot 122b on which the coil 110 is not wound, and it may be also disposed on opposite sides with respect to the rotor shaft 222, whereby maximum torque and maximum efficiency can be realized.

Figure 11:
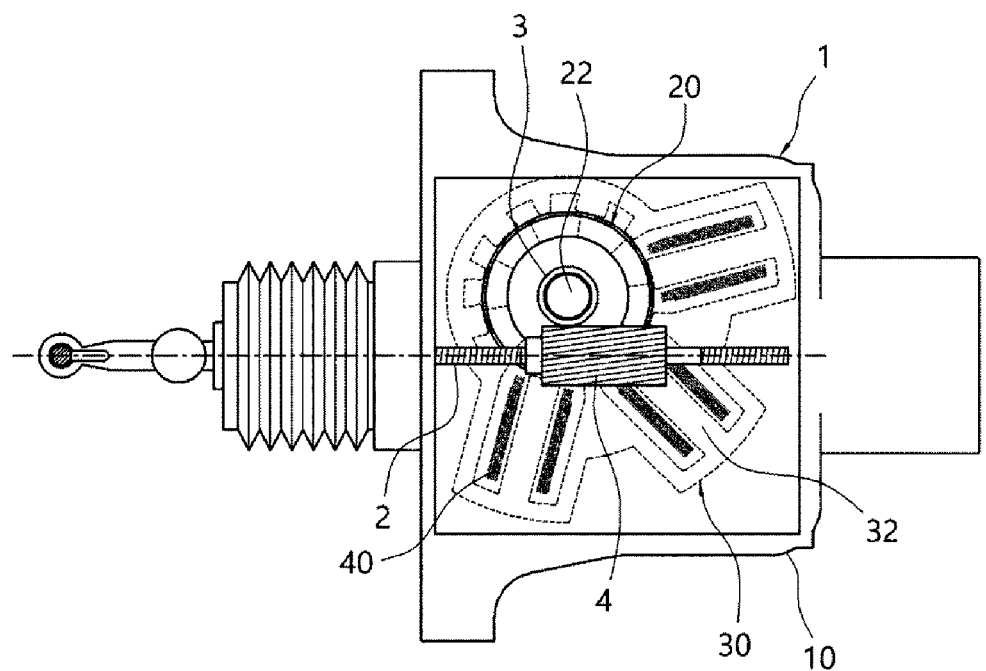
FIG. 11 is a schematic diagram illustrating a connection relationship between a conventional electric motor and a driving rod.

Due to this, when the rotor shaft 222 is disposed at a position biased to one side from the center of the housing 210 so as to be eccentrically connected to the driving rod 2, as shown in FIG. 11, in the conventional electric motor 1, a plurality of slots 122a and 122b on which a coil is wound are disposed to surround only a part of the circumference of the rotor 220, but as shown in FIG. 9, in the electric motor 200 according to one embodiment of the present invention, a plurality of first slots 122a on which the coil 110 is wound may be disposed to surround the entire circumference of the rotor 220 by maximizing space utilization in the housing 210 by using the first straight portion 121a.

Through this, in the electric motor 200 according to one embodiment of the present invention, even if the rotor shaft 222 and the driving rod 2 are eccentrically connected to each other in a limited space where the size and shape are determined, the first slot 122a on which the coil 110 is wound may be disposed to surround the entire circumference of the rotor 220.

Accordingly, the electric motor 200 according to one embodiment of the present invention may maintain the size, mounting position, and eccentric connection between the driving rod 2 and the rotor shaft 222 of the existing housing 210, while reducing the amount of heat generated during the operation of the motor, thereby preventing a decrease in efficiency due to heat loss.

Through this, the efficiency of the electric motor 200 according to one embodiment of the present invention can be improved as compared to a conventional electric motor.

This can be confirmed from the results in Table 1 below.

Comparative Examples 1 and 2 are specifications and motor efficiency compared to the required specifications of the conventional electric motor 1 shown in FIG. 11, and Examples 1 and 2 are specifications and motor efficiency compared to the required specifications of the electric motor 200 to which the stator 100 for an electric motor according to one embodiment of the present invention is applied.

As can be seen in Table 1 above, the electric motor 200 to which the stator 100 for an electric motor according to one embodiment of the present invention is applied may implement a higher efficiency of 8% or more while implementing a torque equivalent to that of the conventional general electric motor 1.

Although exemplary embodiments of the present invention have been described above, the spirit of the present invention is not limited to the embodiments set forth herein. Those of ordinary skill in the art who understand the spirit of the present invention may easily propose other embodiments through supplement, change, removal, addition, etc. of elements within the same spirit, but the embodiments will be also within the scope of the present invention.

The invention claimed is:

1. A stator for an electric motor, comprising:
at least one coil; and
a stator core including a yoke formed in a non-circular closed loop shape with at least one straight portion, and a slot portion extending inward from the yoke by a predetermined length,
wherein the slot portion includes a plurality of first slots on which the coil is wound and a plurality of second slots on which the coil is not wound, and
at least one first slot of the plurality of first slots and at least one second slot of the plurality of second slots form the same phase as each other,
wherein the yoke comprises:
an arc portion formed to have a predetermined curvature; and
a straight portion connected to ends of the arc portion,
wherein the arc portion includes a first arc portion and a second arc portion that are not connected to each other,
wherein the straight portion includes a first straight portion connecting one ends of the first arc portion and the second arc portion to each other and a second straight portion connecting the other ends of the first arc portion and the second arc portion to each other,
wherein the second straight portion includes a first portion connected to an end of the first arc portion and a second portion connected to an end of the first portion and connected to an end of the second arc portion,
wherein the second portion is connected to one end of the first portion to have a predetermined angle except for 0 degree with the first portion.

TABLE 1

| Specifications | | Comparative Example 1 | Comparative Example 2 | Example 1 | Example 2 |
|---|---|---|---|---|---|
| Coil | Coil diameter/number of turns | 0.26/300 | 0.26/300 | 0.28/150 | 0.28/150 |
| Resistance | Ohm (Ω) | 2.3 | 2.3 | 1.96 | 1.96 |
| Magnet | | P9 | P9 | P11 | 28AZ |
| Stator core | | 50H1220 stacked 5t | 50H1220 stacked 5t | 50H1220 stacked 5t | 50H470 stacked 5t |
| Back yoke | t | — | — | 1.0t | 1.0t |
| Back emf | V | 3.06 | 3.06 | 3.99 | 5.37 |
| Phase current | 500 mA | 710 | 490 | 490 | 490 |
| RPM | 4000 | 4000 | 4000 | 4000 | 4000 |
| Torque | 13 mNm or more | 15.5 | 10.8 | 13.7 | 15.3 |
| Phase voltage | 5.2 Volt | 6.5 | 5.3 | 5.2 | 5.1 |
| Iron loss | Watt | 0.44 | 0.34 | 0.58 | 0.38 |
| Efficiency | % | 54.9 | 59.7 | 67.8 | 72.3 |

2. The stator for an electric motor of claim 1,
wherein the slot portion forms a multiphase including a first phase and a second phase different from the first phase,
slots forming the first phase of the slot portion include at least one the first slot and at least one the second slot, and
slots forming the second phase of the slot portion include at least one the first slot and at least one the second slot.

3. The stator for an electric motor of claim 1,
wherein the slot portion forms a multiphase including a first phase and a second phase different from the first phase, and
the number of first slots forming the first phase and the number of first slots forming the second phase are the same number.

4. The stator for an electric motor of claim 1,
wherein the slot portion forms a multiphase including a first phase and a second phase different from the first phase, and
the length of first slots forming the first phase and the length of first slots forming the second phase are formed to have the same length.

5. The stator for an electric motor of claim 1, wherein at least a portion of the plurality of second slots are formed to have a different length from that of the first slot.

6. The stator for an electric motor of claim 1,
wherein the first slot is a slot formed to extend inward by a predetermined length from the arc portion, and
the second slot is a slot formed to extend inward by a predetermined length from the straight portion.

7. The stator for an electric motor of claim 1, wherein the first arc portion and the second arc portion are formed to have the same length as each other.

8. The stator for an electric motor of claim 1, wherein the first arc portion and the second arc portion are formed to have different lengths.

9. The stator for an electric motor of claim 1, wherein in the second straight portion, a portion where the first portion and the second portion are connected to each other is formed to protrude inward of the yoke.

10. The stator for an electric motor of claim 1, wherein in the second straight portion, a portion where the first portion and the second portion are connected to each other is formed to protrude outward of the yoke.

11. An electric motor, comprising:
a housing;
a rotor including a rotor shaft rotatably mounted to the housing and a plurality of magnets disposed along the circumferential direction of the rotor shaft; and
a stator fixed to the housing so as to surround a circumference of the rotor and having a coil wound on at least one slot;
wherein the stator is the stator for an electric motor of claim 1.

12. The electric motor of claim 11,
wherein the rotor shaft is gear-coupled with a driving rod entering the inside of the housing via a gear unit as a medium, and
the driving rod is eccentrically connected to the rotor shaft via the gear unit as a medium.

* * * * *